United States Patent
Allen et al.

(10) Patent No.: US 8,453,317 B2
(45) Date of Patent: Jun. 4, 2013

(54) MAGNETIC WRITE HEAD FABRICATION WITH INTEGRATED ELECTRICAL LAPPING GUIDES

(75) Inventors: Donald Allen, Morgan Hill, CA (US); Jennifer Ai-Ming Leung, Fremont, CA (US); Aron Pentek, San Jose, CA (US); Thomas Roucoux, San Jose, CA (US)

(73) Assignee: HGST Netherlands, B.V., Amsterdam (NL)

( * ) Notice: Subject to any disclaimer, the term of this patent is extended or adjusted under 35 U.S.C. 154(b) by 424 days.

(21) Appl. No.: 12/904,636

(22) Filed: Oct. 14, 2010

(65) Prior Publication Data
US 2012/0094009 A1 Apr. 19, 2012

(51) Int. Cl.
*G11B 5/127* (2006.01)
*H04R 31/00* (2006.01)

(52) U.S. Cl.
USPC ........... 29/603.16; 29/603.11; 29/603.12; 29/603.13; 29/603.15; 29/603.18; 360/121; 360/122; 360/317; 451/5; 451/8; 451/10; 451/36; 451/41

(58) Field of Classification Search
USPC ............ 29/603.09–603.12, 603.15, 603.16, 29/603.18, 603.23, 737; 360/121, 122, 317; 451/5, 8, 10, 36, 37, 41
See application file for complete search history.

(56) References Cited

U.S. PATENT DOCUMENTS

| | | | |
|---|---|---|---|
| 6,786,803 B2 * | 9/2004 | Crawforth et al. | 451/41 |
| 7,014,530 B2 | 3/2006 | Kasiraj et al. | |
| 7,861,400 B2 * | 1/2011 | Lille | 29/603.09 |
| 8,082,657 B2 * | 12/2011 | Lee et al. | 29/603.06 |
| 2006/0028770 A1 * | 2/2006 | Etoh et al. | 360/313 |
| 2006/0168798 A1 * | 8/2006 | Naka | 29/603.16 |
| 2008/0022510 A1 * | 1/2008 | Tanaka | 29/603.16 |
| 2008/0072418 A1 * | 3/2008 | Kondo et al. | 29/603.12 |
| 2008/0074801 A1 | 3/2008 | Takahashi et al. | |
| 2008/0144215 A1 | 6/2008 | Hsiao et al. | |
| 2008/0186513 A1 | 8/2008 | Ono | |
| 2008/0232001 A1 | 9/2008 | Bonhote | |
| 2008/0276448 A1 | 11/2008 | Pentek | |
| 2008/0316652 A1 | 12/2008 | Bonhote | |
| 2009/0117407 A1 | 5/2009 | Zheng | |
| 2009/0144966 A1 | 6/2009 | Zheng | |
| 2009/0152235 A1 | 6/2009 | Hsiao | |
| 2009/0197208 A1 | 8/2009 | Nikitin | |
| 2009/0211081 A1 | 8/2009 | Boone | |
| 2009/0268348 A1 | 10/2009 | Bonhote | |
| 2010/0091407 A1 | 4/2010 | Bonhote | |

* cited by examiner

*Primary Examiner* — Paul D Kim
(74) *Attorney, Agent, or Firm* — Duft Bornsen & Fettig, LLP

(57) ABSTRACT

Methods of fabricating magnetic write heads and electrical lapping guides (ELG's) using a split gap deposition process is described. A removal process is performed on a magnetic material to define a main write pole and to define a corresponding ELG for the main write pole. A first non-magnetic gap layer is deposited. A mask and liftoff process is performed to deposit an electrically conductive material on the first gap layer disposed along a front edge of the ELG. A second non-magnetic gap layer is then deposited and a shield is fabricated for the write pole.

20 Claims, 17 Drawing Sheets

TOP VIEW

PLANE A

CROSS SECTIONAL VIEW A

TOP VIEW

CROSS SECTIONAL VIEW A

TOP VIEW

CROSS SECTIONAL VIEW A

CROSS SECTIONAL VIEW B

TOP VIEW
DESIRED ABS (PLANE A)

CROSS SECTIONAL VIEW A

CROSS SECTIONAL VIEW B

TOP VIEW

CROSS SECTIONAL VIEW A

CROSS SECTIONAL VIEW B

TOP VIEW

CROSS SECTIONAL VIEW A

CROSS SECTIONAL VIEW B

TOP VIEW

PLANE A

CROSS SECTIONAL VIEW A

TOP VIEW

CROSS SECTIONAL VIEW A

TOP VIEW

CROSS SECTIONAL VIEW A

CROSS SECTIONAL VIEW B

TOP VIEW

DESIRED ABS (PLANE A)    FLARE POINT

CROSS SECTIONAL VIEW A

CROSS SECTIONAL VIEW B

TOP VIEW

CROSS SECTIONAL VIEW A

CROSS SECTIONAL VIEW B

TOP VIEW

DESIRED ABS (PLANE A)   FLARE POINT

CROSS SECTIONAL VIEW A

CROSS SECTIONAL VIEW B

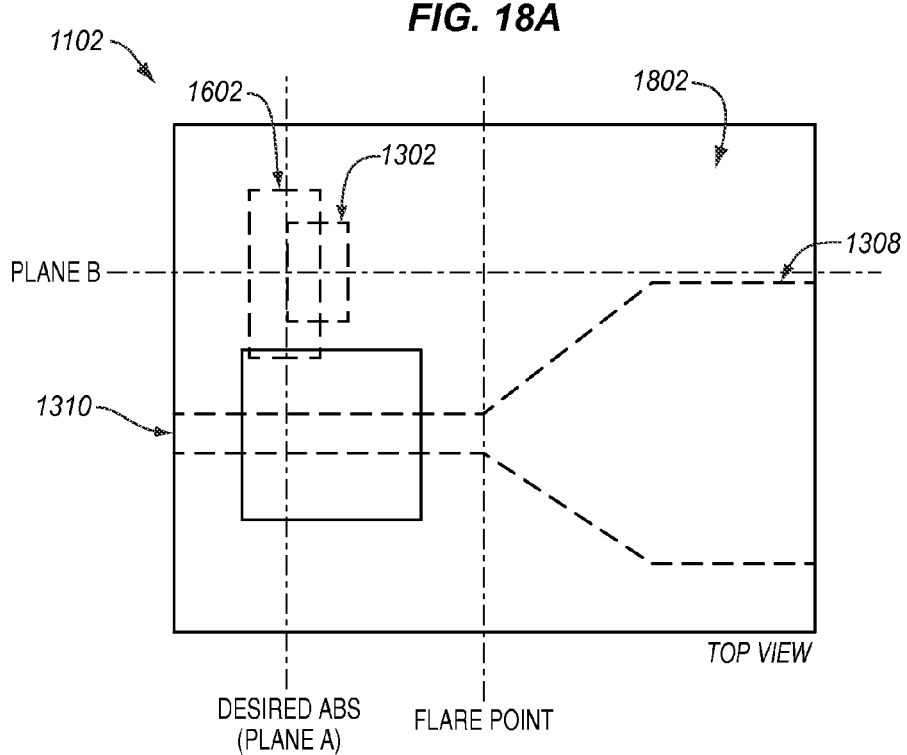
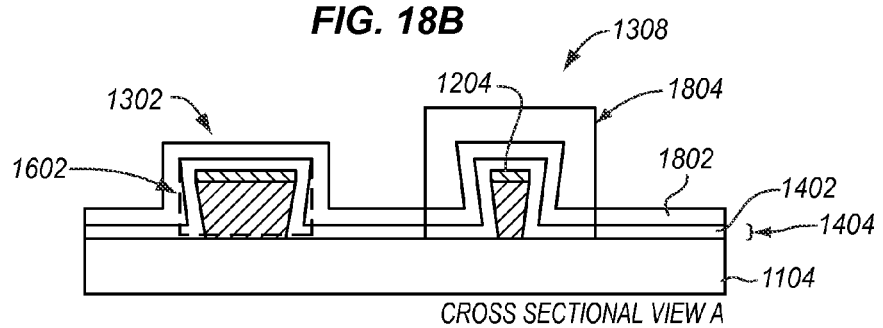
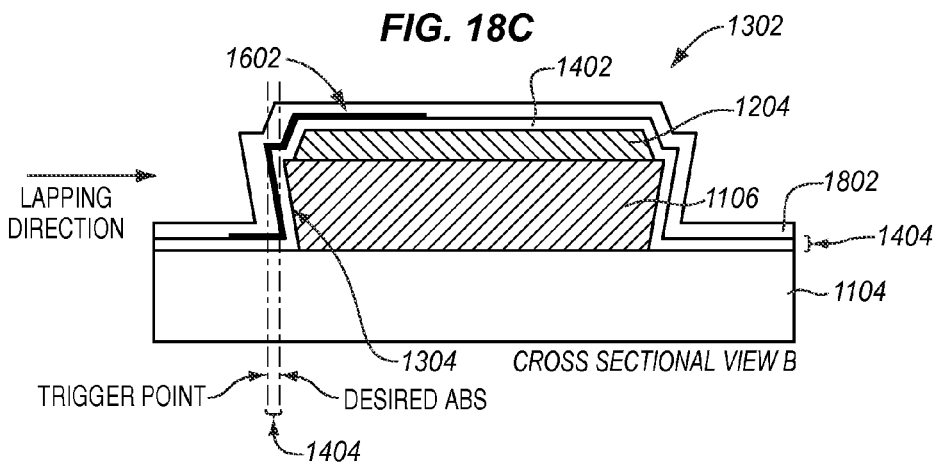

MAGNETIC WRITE HEAD FABRICATION WITH INTEGRATED ELECTRICAL LAPPING GUIDES

FIELD OF THE INVENTION

The invention is related to the field of magnetic disk drive systems, and in particular, to fabricating magnetic write heads and corresponding electrical lapping guides using a split gap deposition process.

BACKGROUND

Many computer systems use magnetic disk drives for mass storage of information. Magnetic disk drives typically include one or more sliders having a read head and a write head. An actuator/suspension arm holds the slider above the surface of a magnetic disk. When the disk rotates, an air flow generated by the rotation of the disk causes an air bearing surface (ABS) side of the slider to fly at a particular height above the disk. As the slider flies on the air bearing, a voice coil motor (VCM) moves the actuator/suspension arm to position the read/write head over selected tracks of the disk. The read/write head may then read data from or write data to the tracks of the disk.

A typical write head includes a main write pole and a return pole. The main write pole has a yoke portion and a pole tip portion. The pole tip extends from the ABS of the recording head to the yoke of the write pole. The point where the pole tip meets the yoke is referred to as the flare point. The point where the yoke begins has a trapezoidal shape that flares outwardly from the pole tip. The yoke of the main write pole then connects to the return pole through a back gap. A coil wraps around the yoke or the back gap to provide the magnetic flux used for the write operation. The width of the pole tip controls the track width that is written by the recording head, so the width of the pole tip is preferably small (i.e., less than 100 nanometers).

Write heads and other components of the slider are typically produced using thin-film deposition and patterning techniques. Material layers which make up a write head for a slider are typically formed by depositing full film materials of the main write pole layers on a non-magnetic layer (e.g., alumina), depositing and patterning a masking layer over the main write pole layers to form a mask structure, etching the exposed portion of the main write pole layers around the mask structure to define a pole tip and a flare point of the write pole, and then removing the mask structure. A trailing shield or a wrap around shield may then be formed around the pole tip. A shield is formed to prevent the main write pole from inadvertently writing to neighboring tracks.

After the read/write heads are formed, the sliders are cut from the wafer into individual sliders, or rows of sliders. The surfaces of the sliders that are exposed when the wafers are cut will eventually form the air bearing surface (ABS) of the slider.

A lapping process is used to form the ABS of a slider, and more particularly, the ABS of the write head. To monitor progress of the lapping process, electronic lapping guides (ELG's) may be fabricated proximate to the write pole. Typically, the ELG's in the write head are fabricated by sharing a number of the same steps as with the write pole, which allows features on the ELG (e.g., a front edge) to accurately correlate with features of the main write pole (e.g., a flare point of the yoke). Lapping removes material from the ABS surface of the slider. During the lapping process, the ELG's provide an electrical signal to a test system that indicates information about the current lapping depth. In some ELG's, the electrical signal indicates an abrupt change in resistance when the front edge surface of the ELG is lapped away. This allows the test system operator to determine a distance between the current lapping depth and the flare point of the yoke. This distance is an important design parameter of the write head and therefore, accurately determining the flare point from the current lapping depth during the lapping process is part of the fabrication process. However, during the fabrication process, not all of the steps of the process are shared between the ELG's and the write pole. Thus, during some steps, a mask structure may be applied to cover the main write pole and expose the ELG's. Materials may then be deposited on the ELG's and not on the main write pole (or the opposite). Problems arise however when the mask structure is subsequently removed from around the main write pole tips, as the pole tips are very thin, fragile, and may be easily broken. Further, some shared fabrication processes for the ELG's and the main write pole may adversely impact the final performance of the ELG's more than the write pole, such as eroding features on the ELG's to render the ELG's less accurate for their intended purpose. Therefore, an ongoing need exists for improving the fabrication process of write heads that include ELG's.

SUMMARY

Embodiments provided herein describe methods of fabricating magnetic write heads and electrical lapping guides (ELG's) using a split gap deposition process. A removal process is performed on a magnetic material to define a main write pole and to define a corresponding ELG for the main write pole. A first non-magnetic gap layer is deposited. A mask and liftoff process is performed to deposit an electrically conductive material on the first gap layer disposed along a front edge of the ELG. A second non-magnetic gap layer is then deposited, and a shield is fabricated for the write pole. In some embodiments, the first and second gap layers form a side gap for a wrap around shield. When the mask and liftoff process is performed between the first and second gap deposition steps, a pole tip of the main write pole is protected from damage when performing the liftoff process. Further, problems related to hard mask erosion around the ELG is prevented by isolating the electrically conductive material from the magnetic material of the ELG using the first gap layer.

One embodiment comprises a method of fabricating a magnetic write head. According to the method, magnetic material is deposited. A first mask structure is formed on the magnetic material that defines a shape for a main write pole and a shape for an electrical lapping guide (ELG). A milling operation is performed to remove the magnetic material exposed by the first mask structure to define the main write pole and the ELG having a front edge. The first mask structure is then removed. A first non-magnetic gap layer is deposited. A second mask structure is formed on the first gap layer that has an opening exposing at least a portion of the first gap layer disposed along the front edge of the ELG. An electrically conductive material is deposited on the first gap layer exposed by the opening of second mask structure. The second mask structure is then removed. A second non-magnetic gap layer is deposited. A shield is then fabricated for the main write pole.

Another embodiment comprises a method of fabricating a magnetic write head. According to the method, a main write pole for the write head is fabricated along with a corresponding ELG. The ELG comprises a magnetic material having a front edge, a first non-magnetic gap layer on the front edge, an electrically conductive material on at least a portion of the first gap layer disposed along the front edge, and a second non-magnetic gap layer on the electrically conductive material. Further according to the method, a shield is fabricated for the write pole. In some embodiments, a lapping process is performed on the write head, and a lapping depth of the lapping process is monitored based on an abrupt change in a resistance of the ELG.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIGS. 18A, 18B, and 18C are a top view, a cross-sectional view A, and a cross-sectional view B, respectively, illustrating the write head after depositing a second non-magnetic gap layer and fabricating a shield according to steps of the method of FIG. 10.

DESCRIPTION OF EMBODIMENTS

Figure 1:
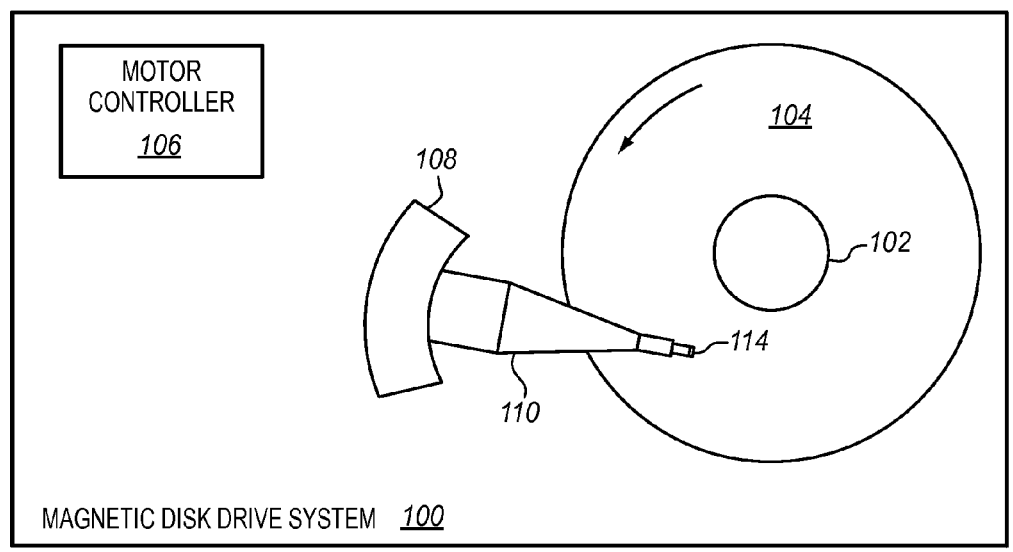
FIG. 1 illustrates a typical magnetic disk drive system.

FIG. 1 illustrates a typical magnetic disk drive system 100. Magnetic disk drive system 100 includes a spindle 102, a magnetic recording disk 104, a motor controller 106, an actuator 108, an actuator/suspension arm 110, and a slider 114. Spindle 102 supports and rotates magnetic recording disk 104 in the direction indicated by the arrow. A spindle motor (not shown) rotates spindle 102 according to control signals from motor controller 106. Slider 114 is supported by actuator/suspension arm 110. Actuator/suspension arm 110 is connected to actuator 108 that moves in order to position slider 114 over a desired track of magnetic recording disk 104. Magnetic disk drive system 100 may include other devices, components, or systems not shown in FIG. 1. For instance, a plurality of magnetic disks, actuators, actuator/suspension arms, and sliders may be used.

When magnetic recording disk 104 rotates, an air flow generated by the rotation of magnetic disk 104 causes an air bearing surface (ABS) of slider 114 to ride on a cushion of air at a particular height above magnetic disk 104. As slider 114 rides on the cushion of air, actuator 108 moves actuator/suspension arm 110 to position a read element (not shown) and a write element (not shown) in slider 114 over selected tracks of magnetic recording disk 104.

Figure 2:
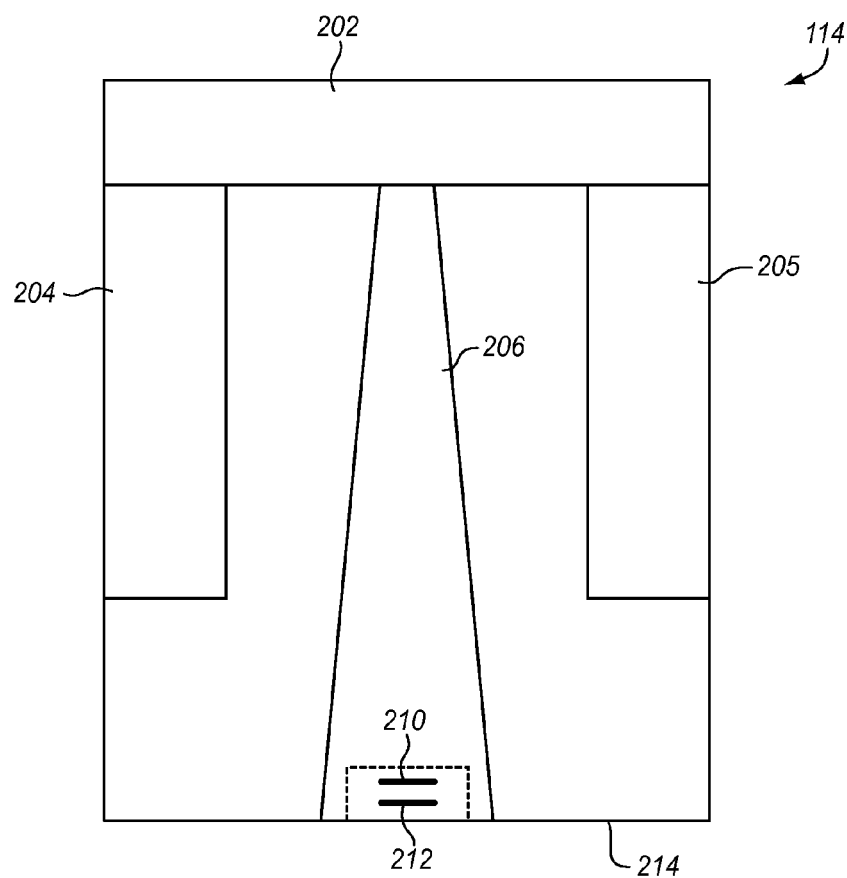
FIG. 2 is an ABS view illustrating a typical slider.

FIG. 2 illustrates a typical slider 114. The view of slider 114 is of the ABS side of slider 114, which is the surface of the page in FIG. 2. Slider 114 has a cross rail 202, two side rails 204—205, and a center rail 206 on the ABS side. The rails on slider 114 illustrate just one embodiment, and the configuration of the ABS side of slider 114 may take on any desired form. Slider 114 also includes a write head 210 and a read head 212 on a trailing edge 214 of slider 114.

Figure 3:
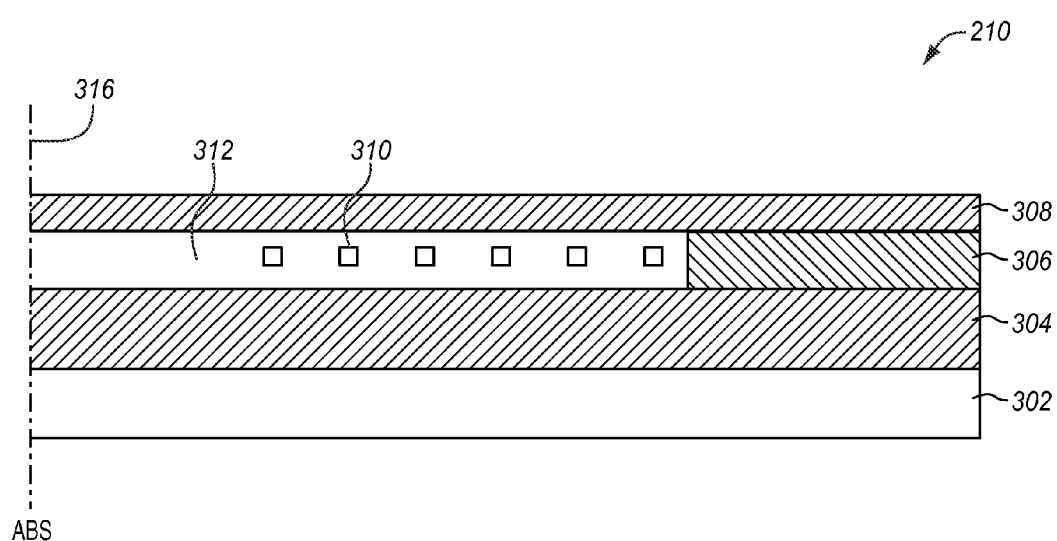
FIG. 3 is a cross-sectional view illustrating a typical write head.

FIG. 3 is a cross-sectional view illustrating a typical write head 210. This view of write head 210 illustrates some of the layers that form write head 210. Write head 210 includes a return pole 304 that is formed on a non-magnetic layer 302. Non-magnetic layer 302 is generally a layer between write head 210 and read head 212 (not shown in this view). Write head 210 further includes a main write pole 308 (or main pole). Main write pole 308 is comprised of a yoke portion (not visible in this view) and a pole tip (also not visible in this view). The pole tip is located proximate to the ABS of recording head 114 and extends inward from the ABS to connect with the yoke portion of main write pole 308. Main write pole 308 and return pole 304 are connected to each other through a back gap layer 306. An inductive coil 310 is sandwiched within an insulation layer 312 between the poles 304 and 308. The rest of coil 310 is not shown in this view as it extends further back (i.e., to the right in this view) in write head 210, although coil 310 may wrap around return pole 304 or main write pole 308 as a matter of design choice. Write head 210 may include other layers not shown, and may take on other configurations in other embodiments. For instance, a trailing shield or a wrap around shield may be formed around the pole tip to reduce cross-track interference when writing data using write head 210.

As discussed in the background, a lapping process is used to form the ABS of a slider, and more particularly, the ABS of write head 210. To monitor progress of the lapping process, electronic lapping guides (ELG's) may be fabricated proximate to main write pole 308 (ELG's are not shown in this view). Typically, the ELG's in write head 210 share some of the fabrication steps with main write pole 308, which allows for features on the ELG (e.g., a front edge of the ELG) to accurately correlate with features of main write pole 308 (e.g., a flare point of the main write pole yoke). During the fabrication, not all the steps of the fabrication process are shared by both the ELG and main write pole 308. Thus, during some steps, a mask structure may be applied to cover main write pole 308 and expose the ELG's. Problems arise, however, when the mask structure is subsequently removed from around the pole tips, as they are very thin and fragile, and therefore may be broken. Further, some shared fabrication processes for the ELG's and main write pole 308 may adversely impact the performance of ELG's more than main write pole 308, for instance, by eroding features on the ELG's such that the ELG's are rendered less accurate for their intended purpose. In order to more clearly understand the prior art fabrication process, FIGS. 4-9 will illustrate a number of steps when fabricating part of write head 210 and an ELG for locating the flare point in write head 210 in the prior art. More particularly, the figures will illustrate steps in forming main write pole 308 on an insulating layer, such as insulating layer 312, as ELG's typically share some of these steps when fabricating main write pole 308.

Figure 4A:
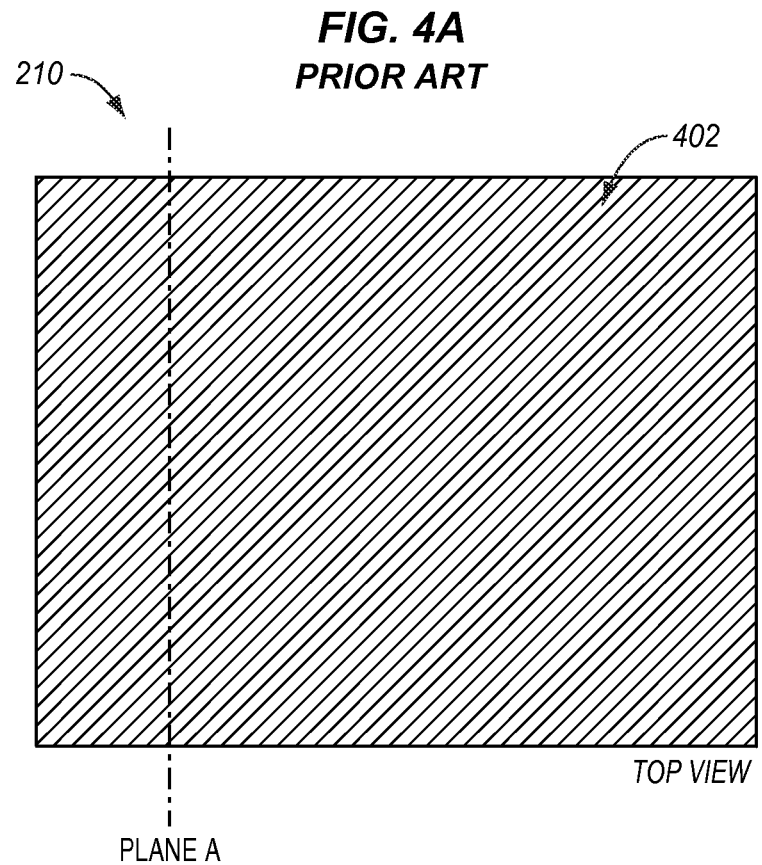
FIGS. 4A and 4B are top and cross-sectional views, respectively, illustrating the result of depositing a magnetic layer on an insulating layer when fabricating portions of the write head of FIG. 3.
Figure 4B:
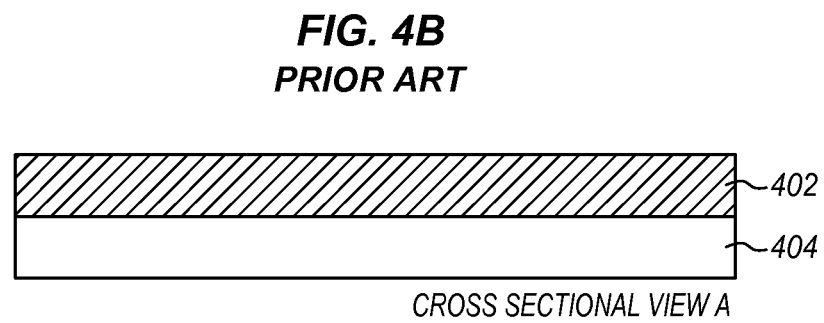

One step in fabricating write head 210 comprises depositing magnetic layers that will eventually form the main write pole. FIGS. 4A and 4B are top and cross-sectional views, respectively, illustrating the result of depositing a magnetic layer 402 (e.g., NiFe, CoFe, etc.) on an insulating layer (such as insulating layer 312) of write head 210. The figures illustrate both a cross sectional view along plane A (FIG. 4B) and a top view (FIG. 4A) of the layers at this point in the process to aid the reader in understanding the various steps. Magnetic layer 402 will be used to form a pole tip and a yoke portion of main pole 308. The top view illustrates that depositing magnetic layer 402 is performed as a full film deposition process (e.g., a wafer level deposition) and therefore covers insulating layer 312.

Figure 5A:
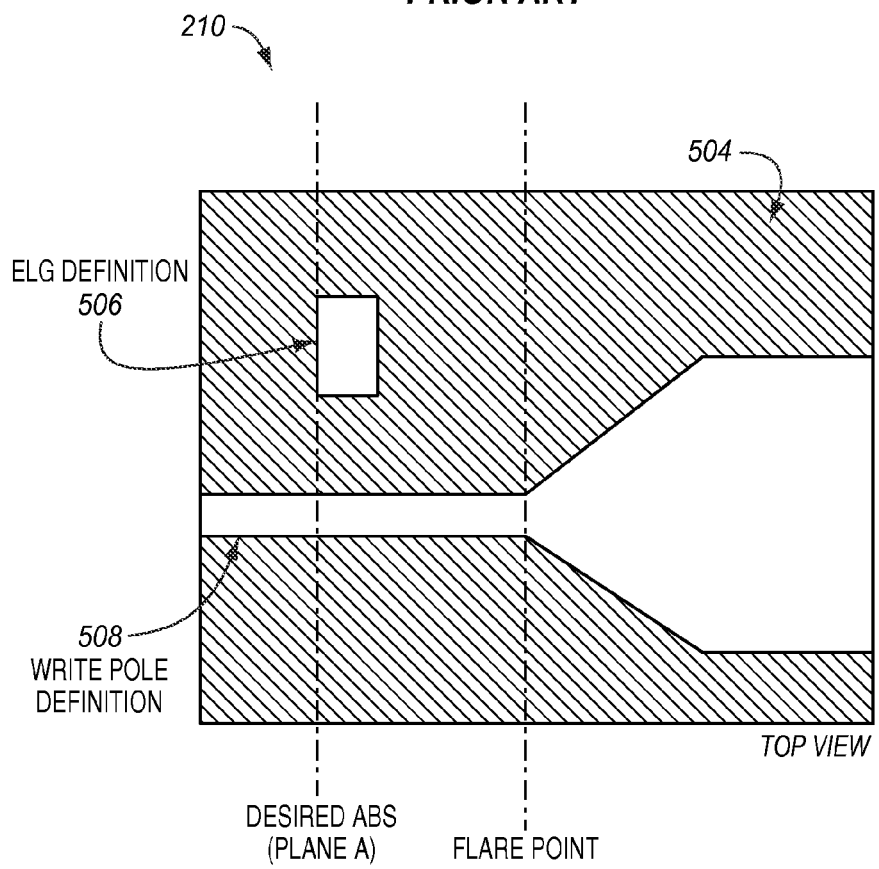
FIGS. 5A and 5B are top and cross-sectional views, respectively, illustrating the result of forming a first mask structure on the magnetic layer defining a main write pole and a corresponding ELG.
Figure 5B:
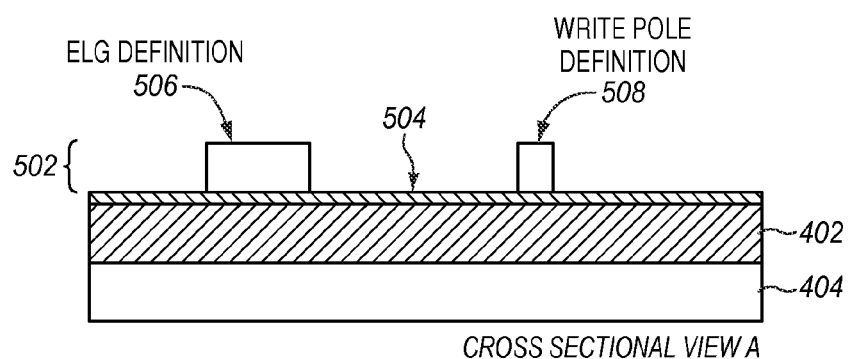

Another step in fabricating write head 210 comprises forming a first mask structure on magnetic layer 402 to define main write pole 308 and a corresponding ELG. FIGS. 5A and 5B are top and cross-sectional views, respectively, illustrating the result of forming a first mask structure 502 on magnetic layer 402. First mask structure 502 may include a hard mask 504, such as alumina, formed directly on magnetic layer 402, an image transfer mask (not shown), and a resist layer (not shown). In FIGS. 5A and 5B, first mask structure 502 has already been photo patterned to define the basic shapes and features of the ELG and main write pole 308, such as an ELG definition 506 and a main write pole definition 508. Specifically, this step shows a track width definition along with a flare point definition for main write pole 308. For instance, the top view shows the desired ABS along a front edge of ELG definition 506, and a flare point of write pole definition 508. In FIGS. 5A and 5B, the final location of the ELG will be located relative to the flare point of main write pole 308.

Figure 6A:
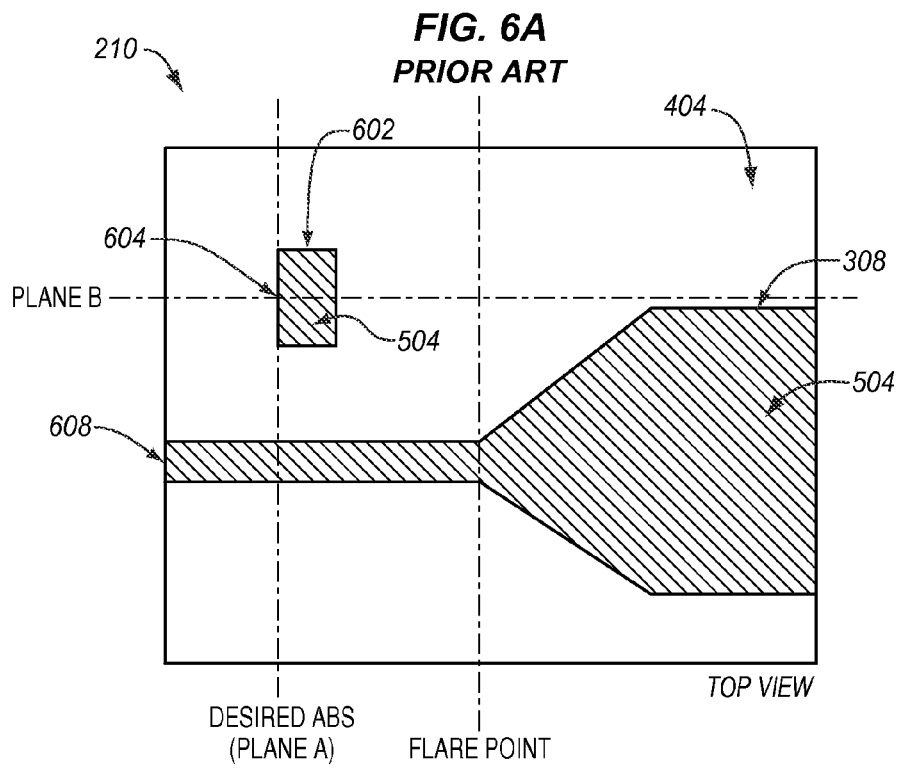
FIGS. 6A, 6B, and 6C are a top view, a cross-sectional view A, and a cross-sectional view B, respectively, illustrating the result of performing a removal process to define the main write pole, the corresponding ELG, and removing a portion of the first mask structure.
Figure 6B:
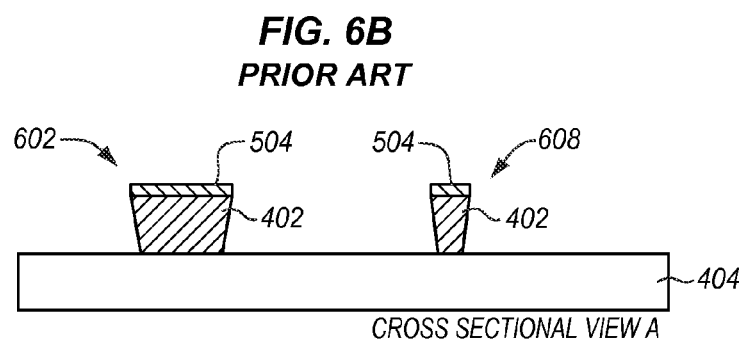
Figure 6C:
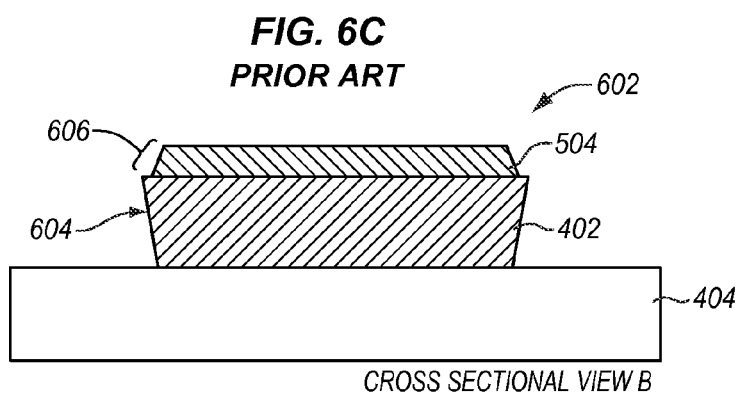

Another step in fabricating write head 210 comprises removing magnetic material 402 exposed by first mask structure 502 to define main write pole 308 and the corresponding ELG, and to remove portions of first mask structure 502. Removing portions of first mask structure 502 may comprise removing a resist layer and an image transfer layer, while allowing hard mask 504 layer to remain. FIGS. 6A, 6B, and 6C are a top view, a cross-sectional view A, and a cross-sectional view B, respectively, illustrating the result of performing a removal process to define an ELG 602 and main write pole 308 including a pole tip 608, and to remove portions of first mask structure 502. The removal process may include ion milling, reactive ion etching, etc. Typically, the removal process is performed at one or more angles to form main write pole 308 having tapered sides, such as shown in the cross sectional view A of FIG. 6B. This main write pole 'beveling' process also impacts ELG 602 as shown in the cross sectional view B of FIG. 6C. During the beveling process used to taper the sides and define main write pole 308, an erosion of hard mask 504 on ELG 602 may occur. The erosion exposes a portion 606 of main write pole material 402 near a front edge 604 of ELG 602 where hard mask 504 erodes. This is problematic for the performance of ELG 602 in allowing for a determination of the desired ABS location during the lapping process. How the performance of ELG 602 is impacted will become more readily apparent during subsequent fabrication steps and the following discussion.

Figure 7A:
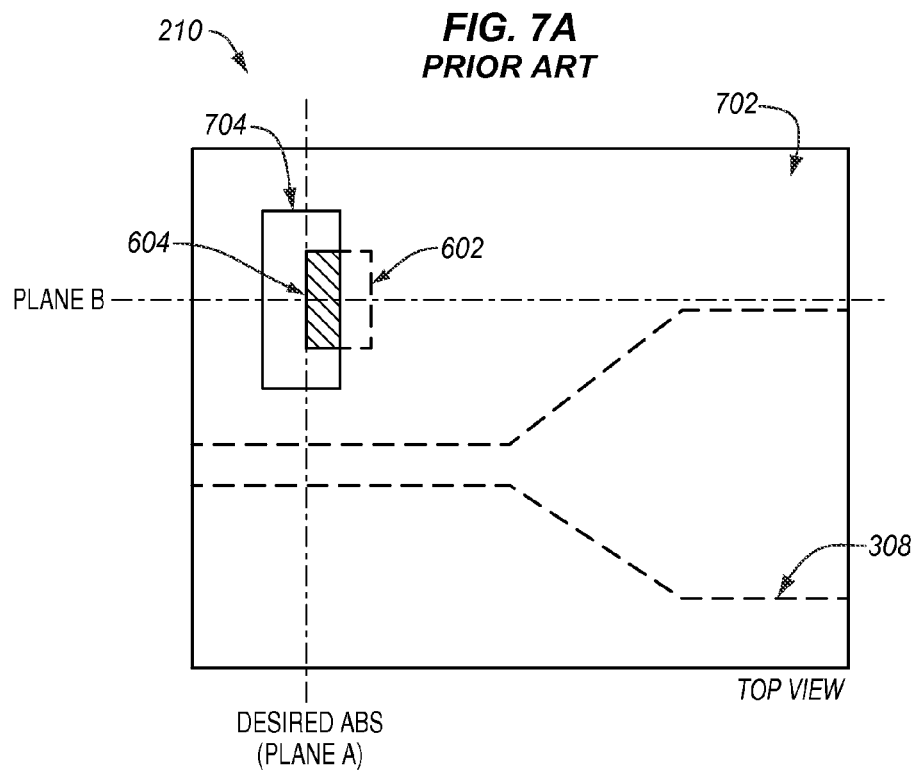
FIGS. 7A, 7B, and 7C are a top view, a cross-sectional view A, and a cross-sectional view B, respectively, illustrating the result of forming a second mask structure prior to depositing an electrically conductive material.
Figure 7B:
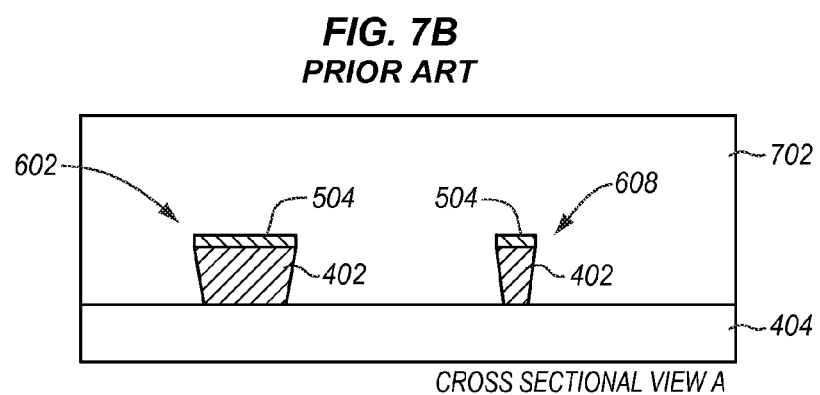
Figure 7C:
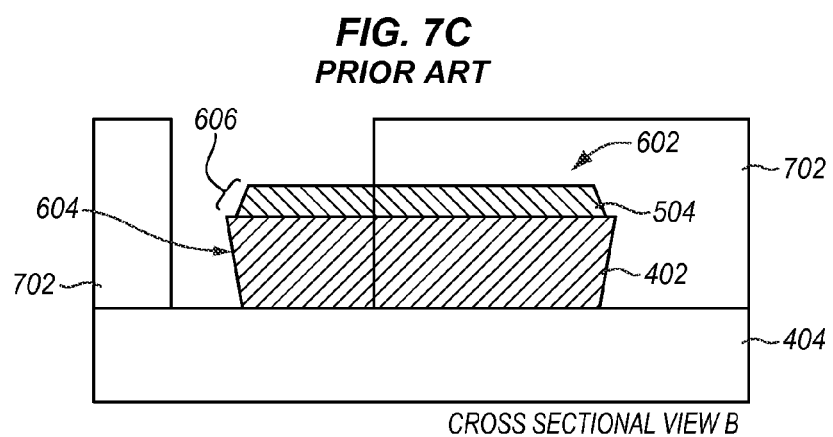

Another step in fabricating write head 210 comprises forming a second mask structure prior to depositing an electrically conductive material, such as gold. FIGS. 7A, 7B, and 7C are a top view, a cross-sectional view A, and a cross-sectional view B, respectively, illustrating the result of forming a second mask structure 702 over main write pole 308 and a portion of ELG 602 prior to depositing an electrically conductive material, such as gold. Second mask structure 702 covers main write pole 308 and exposes a portion of front edge 604 of ELG 602 within an opening 704. This is illustrated in the top view shown in FIG. 7A which shows the covered features of ELG 602 and main write pole 308 as dashed lines. Main write pole 308 is covered (i.e., protected from the deposition) because the electrically conductive material is preferably not deposited on main write pole 308. Opening 704 allows a subsequent deposition process to reach front edge 604 of ELG 602.

Figure 8A:
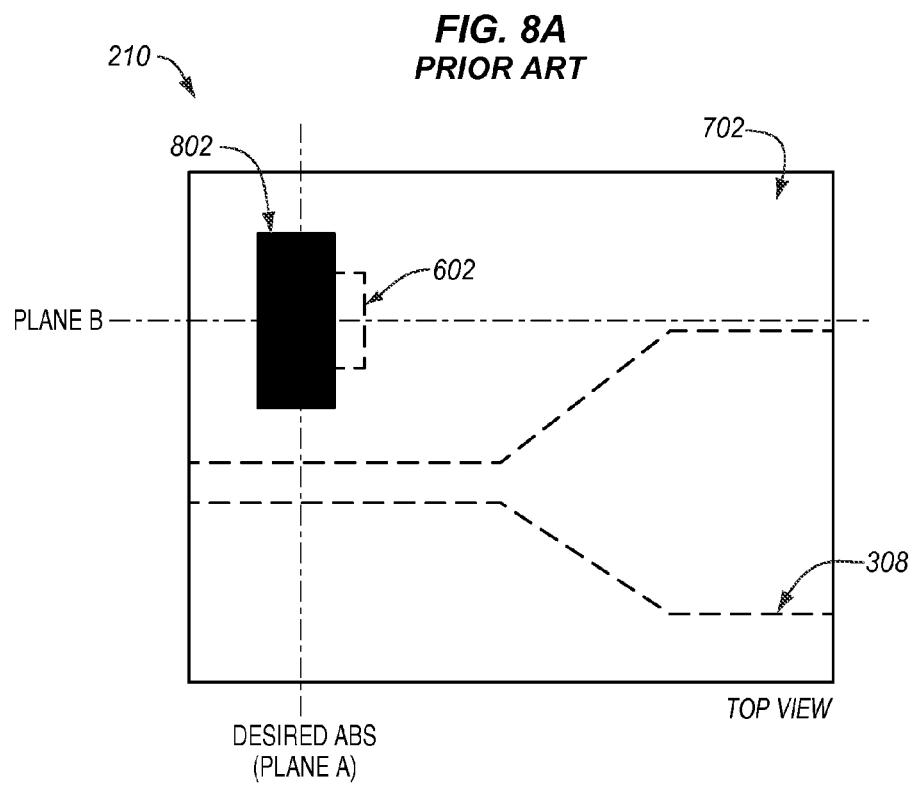
FIGS. 8A, 8B, and 8C are a top view, a cross-sectional view A, and a cross-sectional view B, respectively, illustrating the result of depositing an electrically conductive material.
Figure 8B:
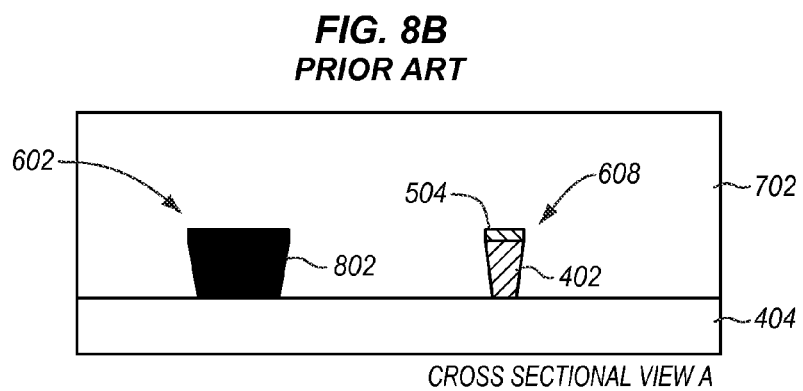
Figure 8C:
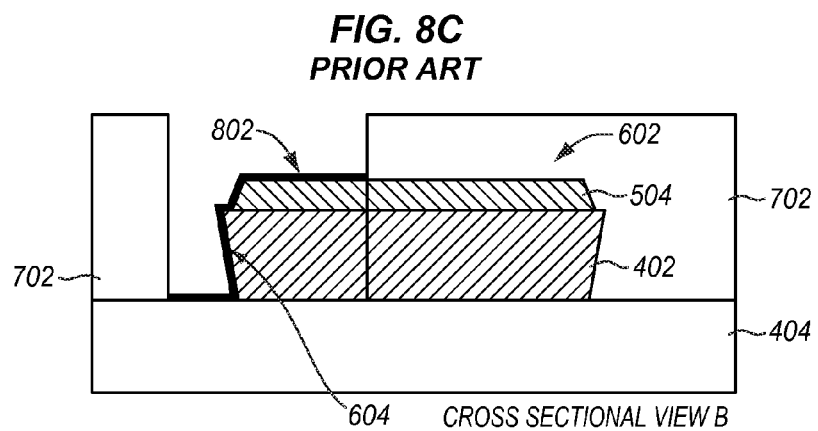

Another step in fabricating write head 210 comprises depositing the electrically conductive material. FIGS. 8A, 8B, and 8C are a top view, a cross-sectional view A, and a cross-sectional view B, respectively, illustrating the result of depositing an electrically conductive material 802. Material 802 covers ELG 602 along front edge 604 (see FIG. 8B) where it was exposed by opening 704 of second mask structure 702. Material 802 may also cover second mask structure 702 in this step, but this has been omitted to allow for the features under second mask structure 702 (e.g., ELG 602 and main write pole 308) to be clearly identified.

Figure 9A:
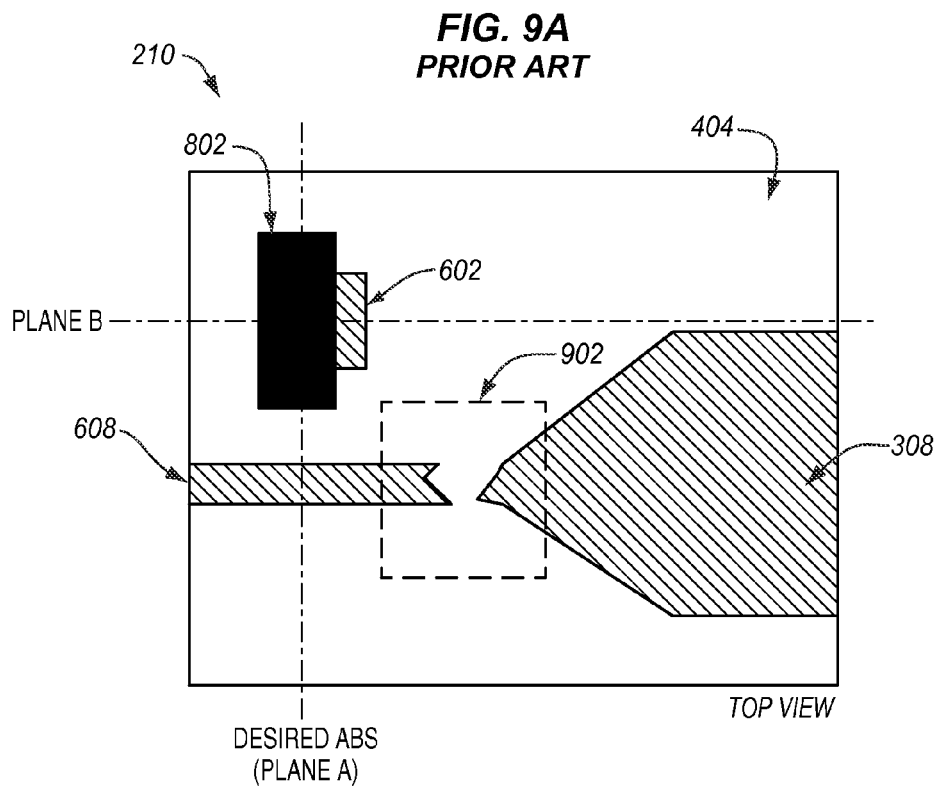
FIGS. 9A, 9B, and 9C are a top view, a cross-sectional view A, and a cross-sectional view B, respectively, illustrating the result of removing the second mask structure.
Figure 9B:
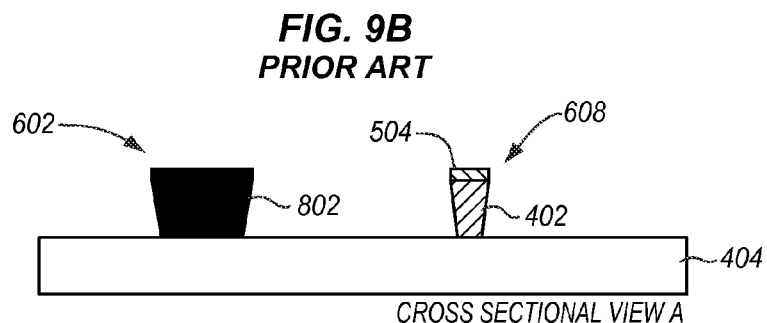
Figure 9C:
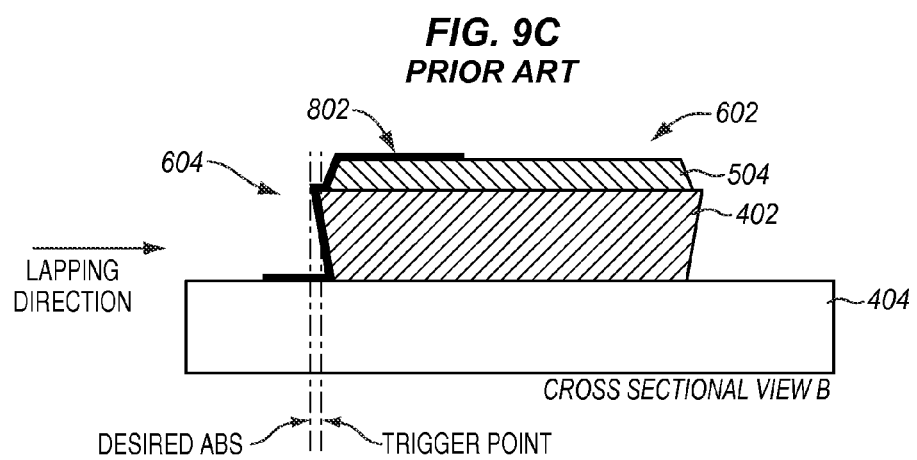

Another step in fabricating write head 210 comprises removing second mask structure 702. FIGS. 9A, 9B, and 9C are a top view, a cross-sectional view A, and a cross-sectional view B, respectively, illustrating the result of removing the mask structure 702. In some cases, pole tip 608 may be broken off of main write pole 308 during the removal of second mask structure 702, as shown within area 902 of the top view (FIG. 9A), because pole tip 608 is thin and fragile. When pole tip 608 is disconnected from main write pole 308, write head 210 will not function correctly. The cross sectional view B shown in FIG. 8C also illustrates another problem with the prior art process. When hard mask 504 is eroded during the beveling step and exposes some of magnetic material 402 along front edge 604 of ELG 602, some of the electrically conductive material 802 is deposited in this area.

This may cause problems in a subsequent lapping process used to determine the desired ABS point of write head 210. The subsequent lapping process would be performed after a number of additional fabrication steps were performed for write head 210, such as depositing side gap material around pole tip 608 and forming a shield for pole tip 608 (e.g., a wrap around shield or a trailing shield). Further, one or more electrical contacts may be fabricated for ELG 602 to allow for the monitoring of ELG 602 during lapping. Such additional steps are not necessary for the current discussion and therefore will be omitted for brevity.

The cross sectional view B shown in FIG. 9C illustrates that lapping is performed from left to right. To monitor a resistance of ELG 602, an electrical circuit is created that includes electrically conductive material 802 as part of the circuit. As electrically conductive material 802 is removed from ELG 602, the resistance of the circuit would remain relatively the same. However, as electrical conductive material 802 is lapped away and begins to detach from magnetic material 402 along front edge 604, the resistance begins to change. Due to the erosion of hard mask 504, the trigger point of this change in resistance moves further towards the flare point of main write pole 308, as indicated in FIG. 9C. In other words, more material is removed from the ABS of write head 210 than is expected based on the position of front face 604 of ELG 602. This is problematic because it is preferable that the desired ABS point in the lapping process be accurately determined. The following discussion will detail an improved method of fabrication which will protect the pole tips from breakage and prevent the movement of the trigger point for the ELG's in the write head.

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 10:
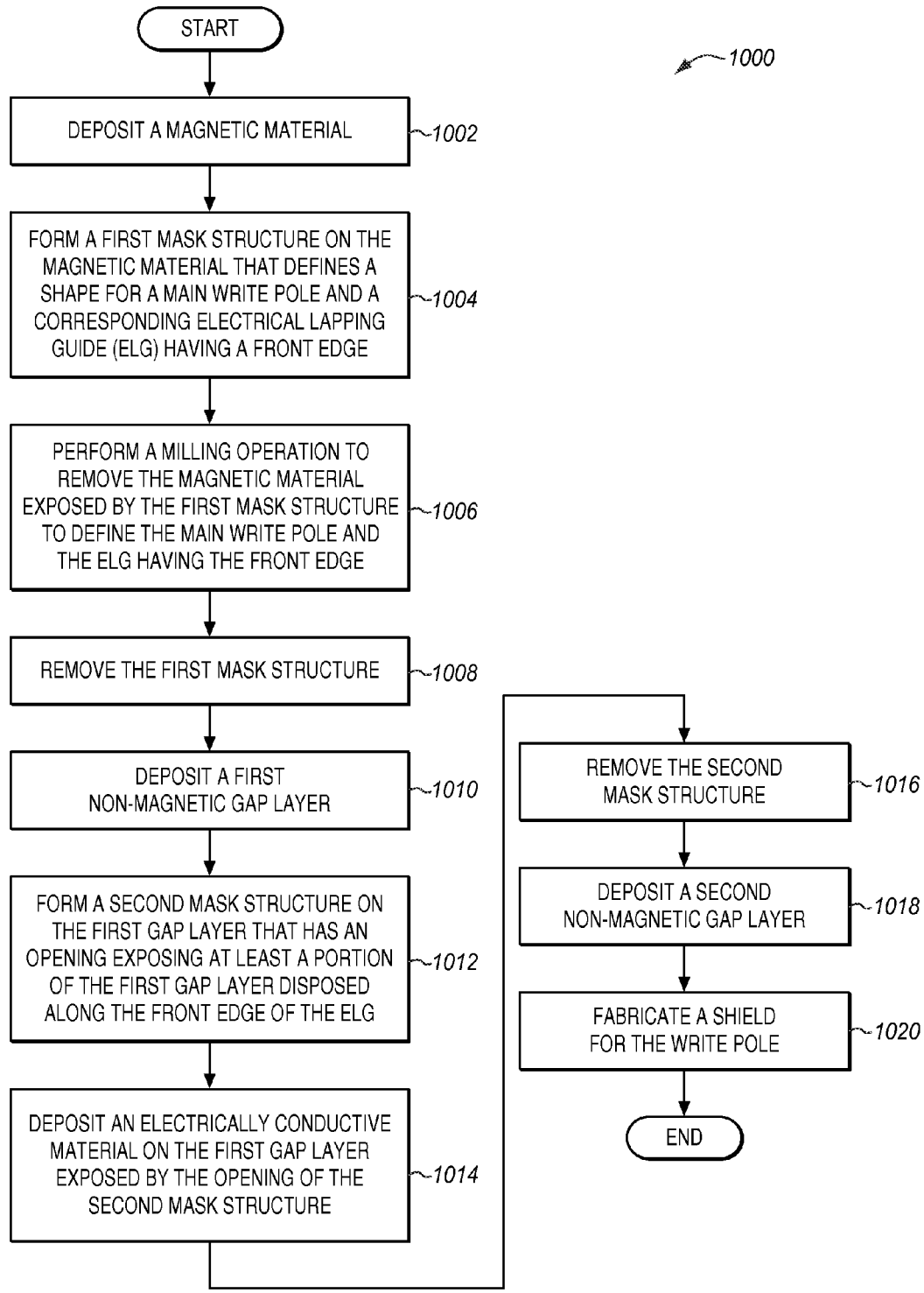
FIG. 10 is a flow chart illustrating a method of fabricating a magnetic write head in an exemplary embodiment.

FIG. 10 is a flow chart illustrating a method 1000 of fabricating a magnetic write head in an exemplary embodiment. The steps of the flow charts provided herein are not all inclusive and other steps, not shown, may be included. Further, the steps may be performed in an alternative order. Further, the magnetic write head may be fabricated on a number of preexisting layers of a wafer, such as layers forming a read head. While the following discussion details the fabrication of one write head on a wafer, one skilled in the art understands that fabricating write heads is a wafer level fabrication process, and that hundreds or even thousands of write heads may be fabricated simultaneously.

Figure 11A:
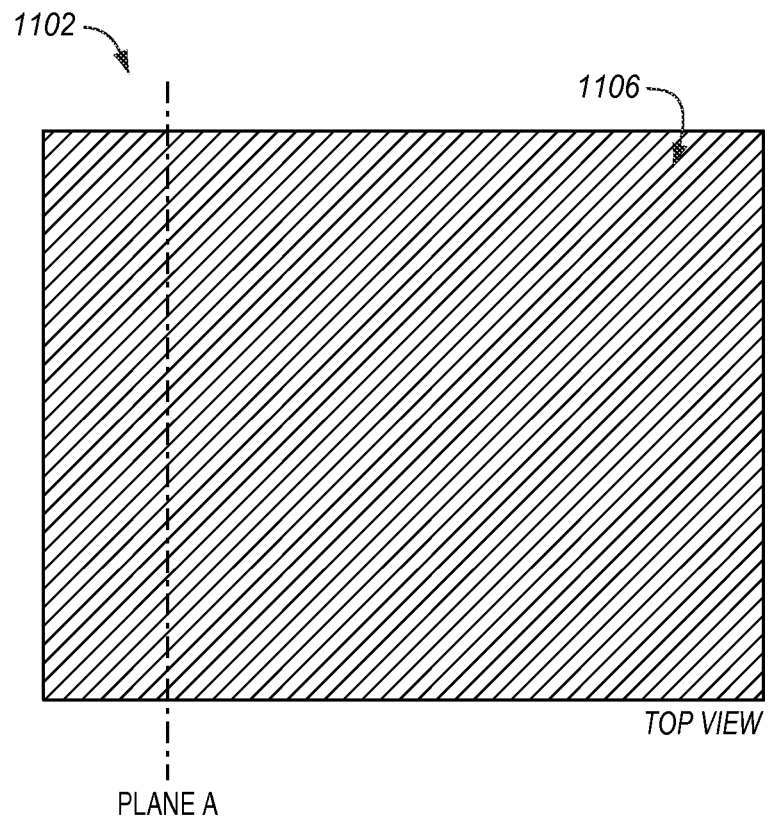
FIGS. 11A and 11B are top and cross-sectional views, respectively, illustrating a write head after depositing a magnetic material according to a step of the method of FIG. 10.
Figure 11B:
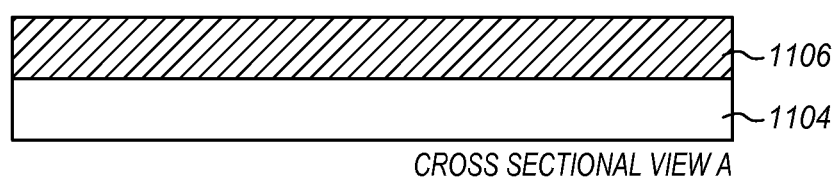

Step 1002 of method 1000 comprises depositing a magnetic material. The magnetic material may be deposited on a non-magnetic layer, such as an insulating layer formed on a read head previously fabricated on a wafer. FIGS. 11A and 11B are top and cross-sectional views, respectively, illustrating a write head 1102 after depositing magnetic material 1106 according to step 1002. Write head 1102 may include some of the layers and features of write head 210 of FIG. 3, however one skilled in the art understands that write heads may be fabricated to include a number of layers and features not shown in FIG. 3. Thus, write head 1102 is not limited to the specific embodiment shown in FIG. 3. Magnetic material 1106 may be deposited on a non-magnetic under layer, such as insulating layer 1104 (e.g., alumina). Magnetic material 1106 will be used to form a pole tip and a yoke portion of a main write pole. The top view of FIG. 11A illustrates that depositing magnetic material 1106 is performed as a full film deposition process (e.g., a wafer level deposition). The cross sectional view A shown in FIG. 11B (illustrated along plane A of FIG. 11A) illustrates magnetic layer 1106 on top of insulating layer 1104.

Figure 12A:
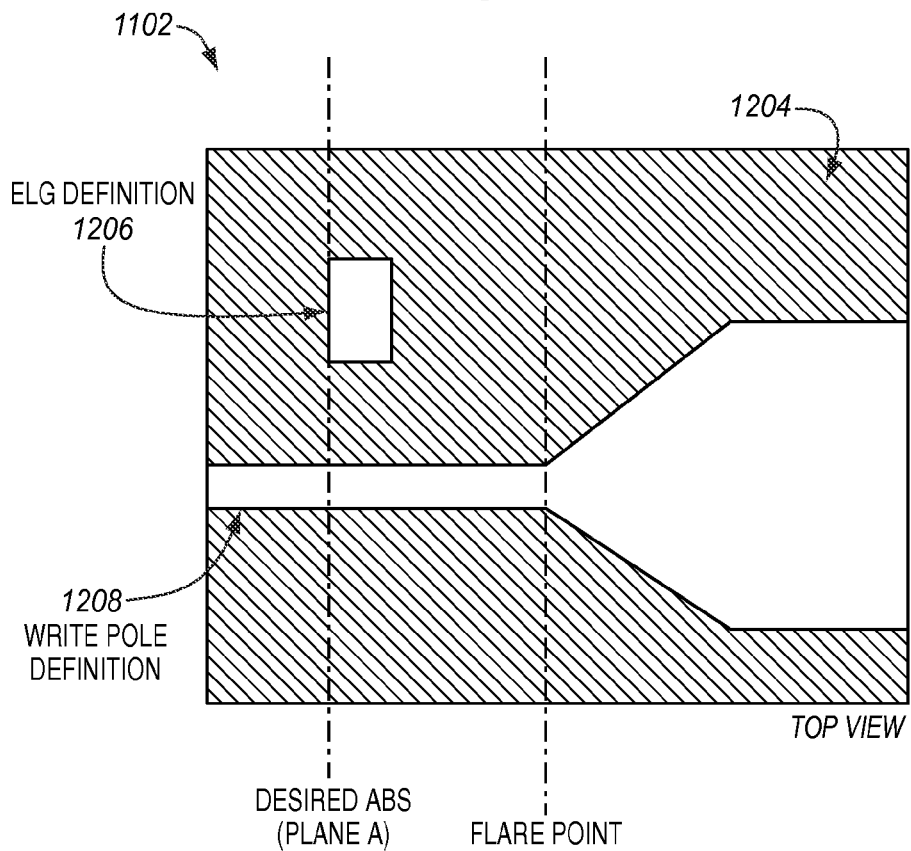
FIGS. 12A and 12B are top and cross-sectional views, respectively, illustrating the write head after forming a first mask structure on a magnetic material according to a step of the method of FIG. 10.
Figure 12B:
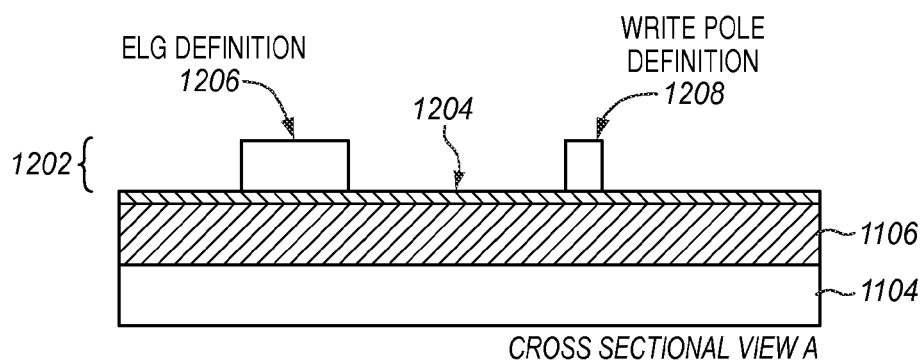

Step 1004 comprises forming a first mask structure on magnetic material 1106 that defines a shape for a main write pole and a shape for a corresponding ELG having a front edge. FIGS. 12A and 12B are top and cross-sectional views, respectively, illustrating write head 1102 after forming first mask structure 1202 on magnetic material 1102 according to step 1004. First mask structure 1202 may include a hard mask 1204, such as alumina, formed directly on magnetic material 1106, an image transfer mask (not shown), and a resist layer (not shown). In FIGS. 12A and 12B, first mask structure 1202 has already been photo patterned to define the basic shapes and features of the ELG and the write pole. First mask structure 1202 comprises an ELG definition 1206 for defining a future ELG and a main write pole definition 1208 for defining a future write pole. Specifically, this step shows a track width definition along with a flare point definition for the write pole. For instance, the top view shown in FIG. 12A illustrates the desired ABS along the front edge of ELG definition 1206, and a flare point of main write pole definition 1208. The final location of the ELG will be located relative to the flare point of the write pole.

Figure 13A:
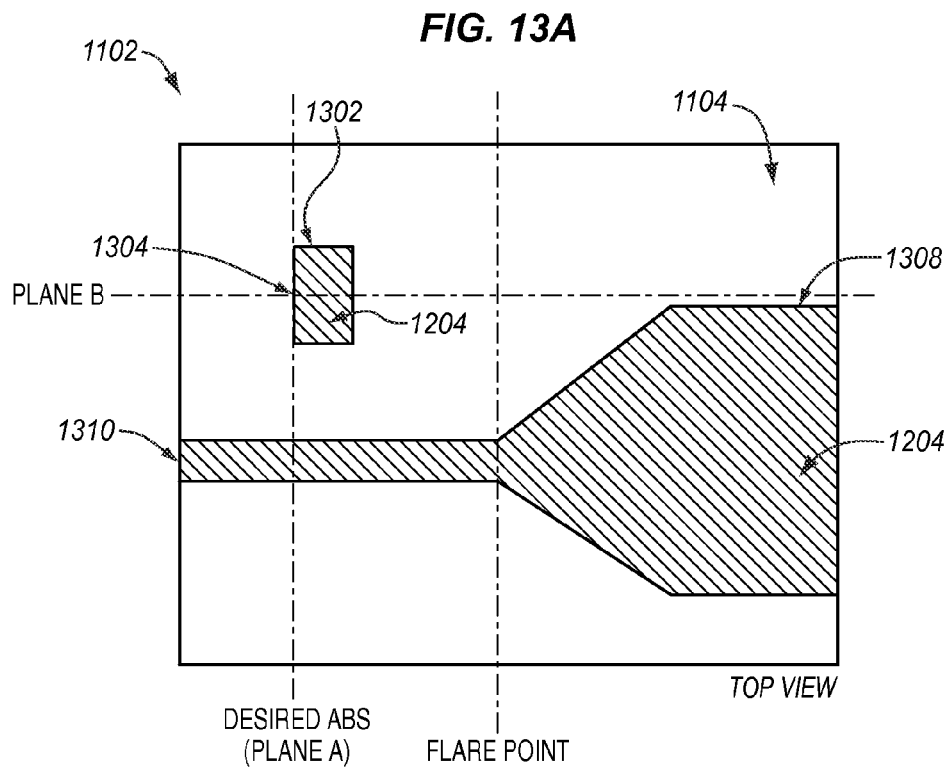
FIGS. 13A, 13B, and 13C are a top view, a cross-sectional view A, and a cross-sectional view B, respectively, illustrating the write head after performing a removal process to define the main write pole, the corresponding ELG, and removing a portion of the first mask structure according to steps of the method of FIG. 10.
Figure 13B:
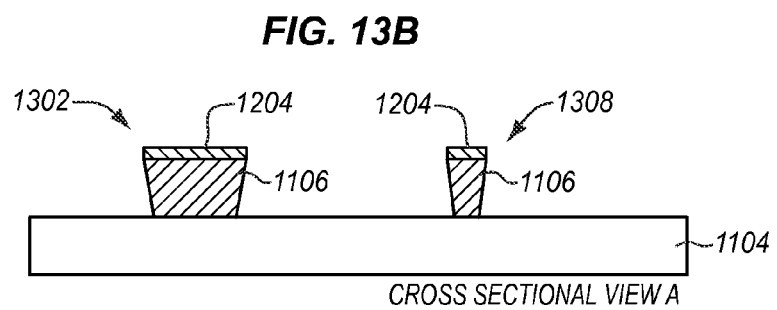
Figure 13C:
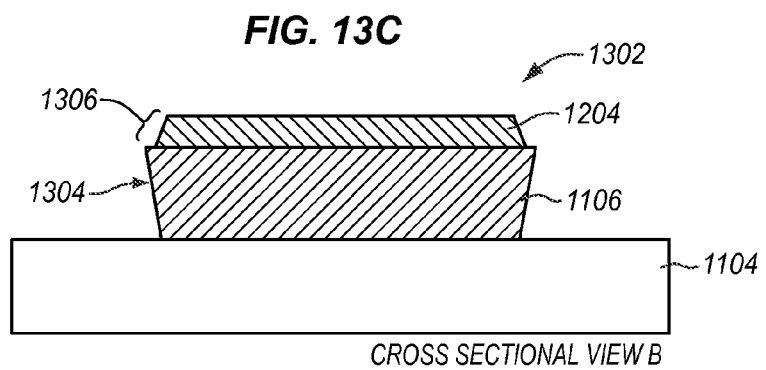

Step 1006 comprises performing a milling operation to remove magnetic material 1106 exposed by first mask structure 1202 to define the main write pole and an ELG having a front edge. Step 1008 comprises removing first mask structure 1202. Removing portions of first mask structure 1202 may comprise removing a resist layer and an image transfer layer, while allowing hard mask 1204 layer to remain. FIGS. 13A, 13B, and 13C are a top view, a cross-sectional view A, and a cross-sectional view B, respectively, illustrating write head 1102 after performing the milling operation according to step 1006 and removing a portion of first mask structure 1202 according to step 1008. In steps 1006-1008, the removal process may include ion milling, reactive ion etching, etc., to define a main write pole 1308 and an ELG 1302. The top view shown in FIG. 13A illustrates the relative placement of main write pole 1308 and ELG 1302. ELG 1302 has been defined having a front edge 1304 located at the desired ABS for write head 1102. Main write pole 1308 includes the flare point and a pole tip 1310. FIG. 13A also illustrates that both ELG 1302 and main write pole 1308 are covered by hard mask 1204. Typically, the removal process is performed at one or more angles to produce tapered sides for main write pole 1308, such as shown in FIG. 13B for main write pole 1308. This main write pole 'beveling' process also impacts ELG 1302 as shown in the cross sectional view B shown in FIG. 13C (illustrated along plane B of FIG. 13A) of ELG 1302. During the beveling process used to taper the sides and to define main write pole 1308, an erosion of hard mask 1204 on ELG 1302 may occur. The erosion exposes a portion 1306 of magnetic material 1106 near a front edge 1304 of ELG 1302 where hard mask 1204 erodes. This is problematic for the performance of prior art ELG's as discussed previously.

Figure 14A:
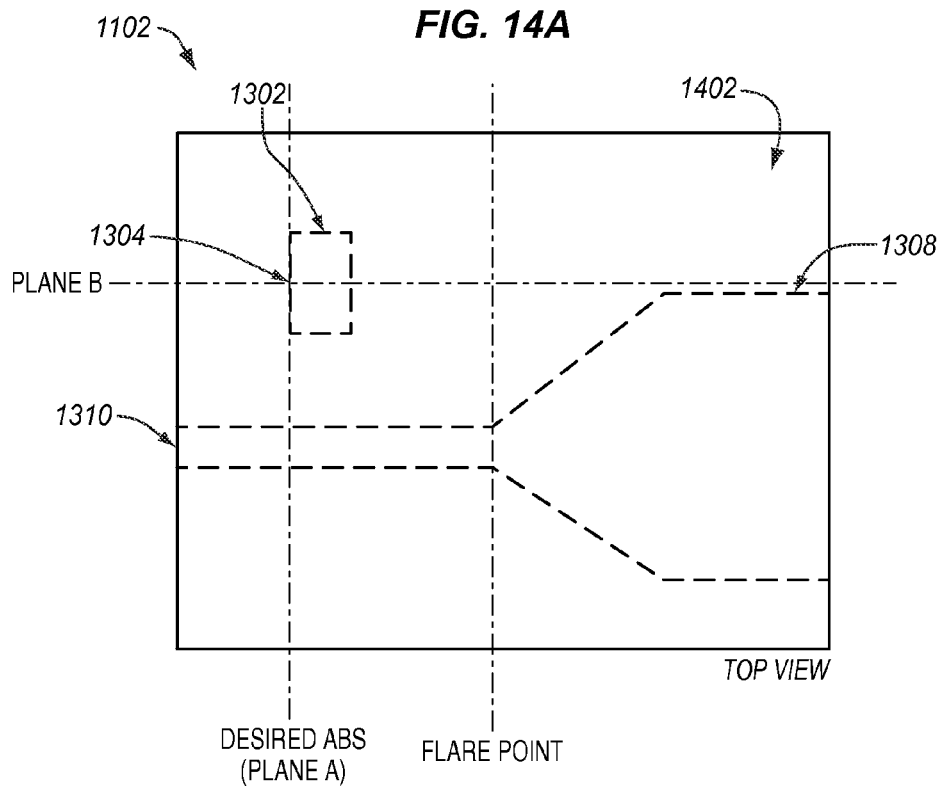
FIGS. 14A, 14B, and 14C are a top view, a cross-sectional view A, and a cross-sectional view B, respectively, illustrating the write head after depositing a first non-magnetic gap layer according to a step of the method of FIG. 10.
Figure 14B:
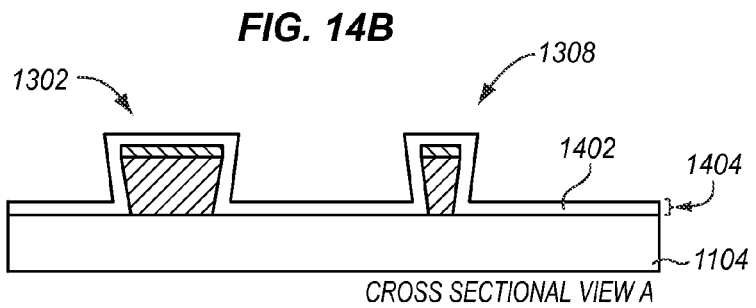
Figure 14C:
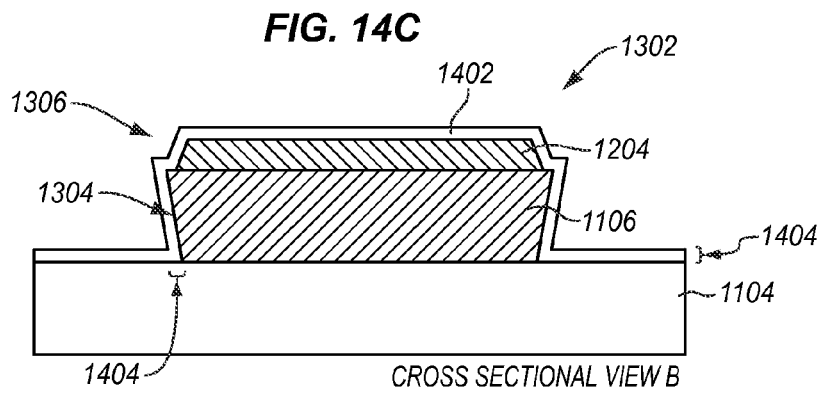

Step 1010 comprises depositing a first non-magnetic gap layer (e.g., alumina). FIGS. 14A, 14B, and 14C are a top view, a cross-sectional view A, and a cross-sectional view B, respectively, illustrating write head 1102 after depositing a first non-magnetic gap layer 1402 according to step 1010.

First gap layer 1402 may form a portion of a side gap for a wrap around shield in some embodiments. Typically, first gap layer 1402 is deposited using an Atomic Layer Deposition (ALD) process, which allows a thickness 1404 of first gap layer 1402 to be precisely controlled. In some embodiments, thickness 1404 of first gap layer 1402 is about 50 nanometers. As can be seen in FIG. 14C, first gap layer 1402 covers magnetic material 1106 along front edge 1304 and portion 1306 of magnetic material 1106 exposed by the erosion of hard mask 1204.

Figure 15A:
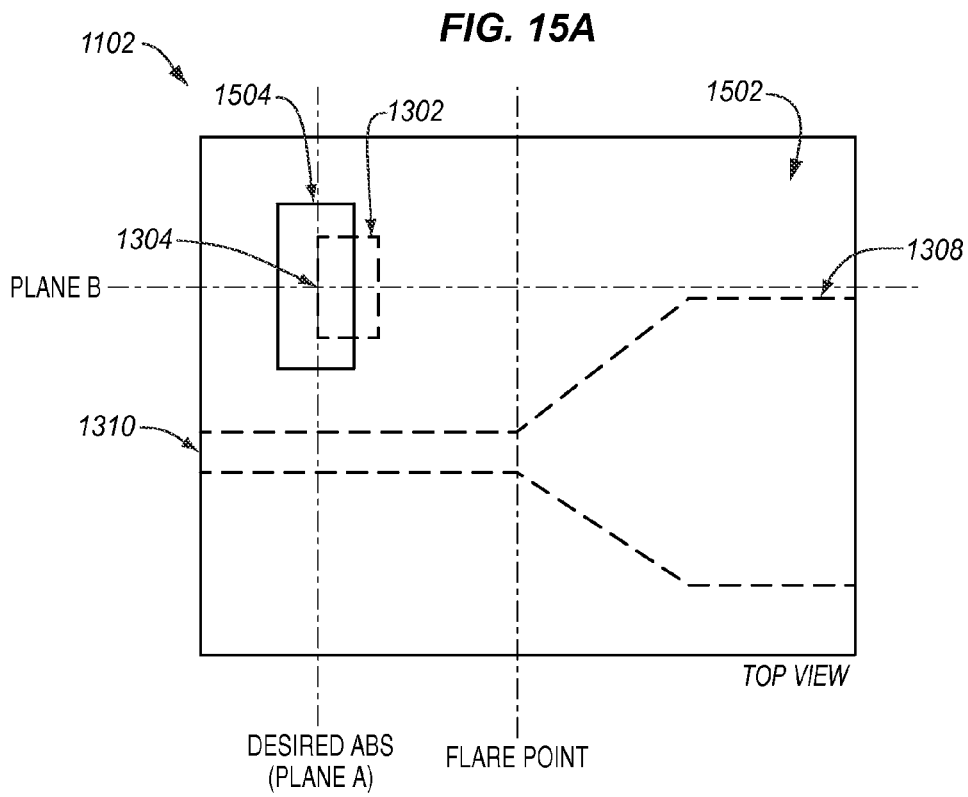
FIGS. 15A, 15B, and 15C are a top view, a cross-sectional view A, and a cross-sectional view B, respectively, illustrating the write head after forming a second mask structure on the first gap layer according to a step of the method of FIG. 10.
Figure 15B:
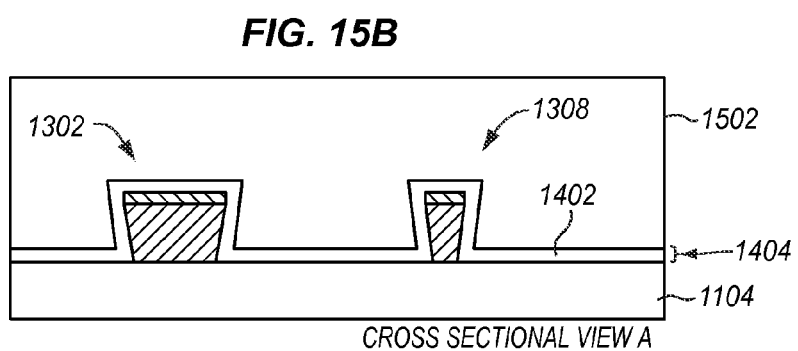
Figure 15C:
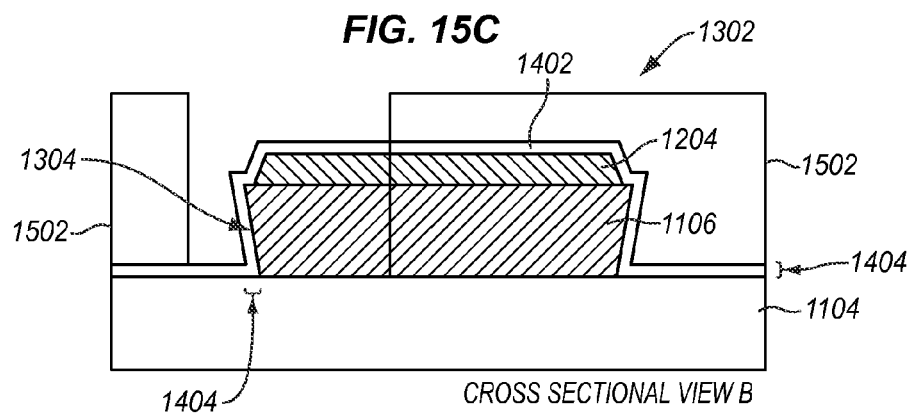

Step 1012 comprises forming a second mask structure on first gap layer. The second mask structure has an opening exposing at least a portion of first gap layer 1402 disposed along front edge 1304 of ELG 1302. FIGS. 15A, 15B, and 15C are a top view, a cross-sectional view A, and a cross-sectional view B, respectively, illustrating write head 1102 after forming a second mask structure 1502 on first gap layer 1402 according to step 1012. Second mask structure 1502 is formed prior to depositing an electrically conductive material, such as gold. Second mask structure 1502 covers a majority of first gap layer 1402 and exposes a portion of first gap layer 1402 disposed along front edge 1304 of ELG 1302 within an opening 1504. This is illustrated in the top view shown in FIG. 15A, which illustrates ELG 1302 and main write pole 1308 under first gap layer 1402 and second mask structure 1502 as dashed lines. The area around main write pole 1308 is covered (i.e., protected from the deposition) because the electrically conductive material is preferably not deposited on first gap layer 1402 around main write pole 1308.

Figure 16A:
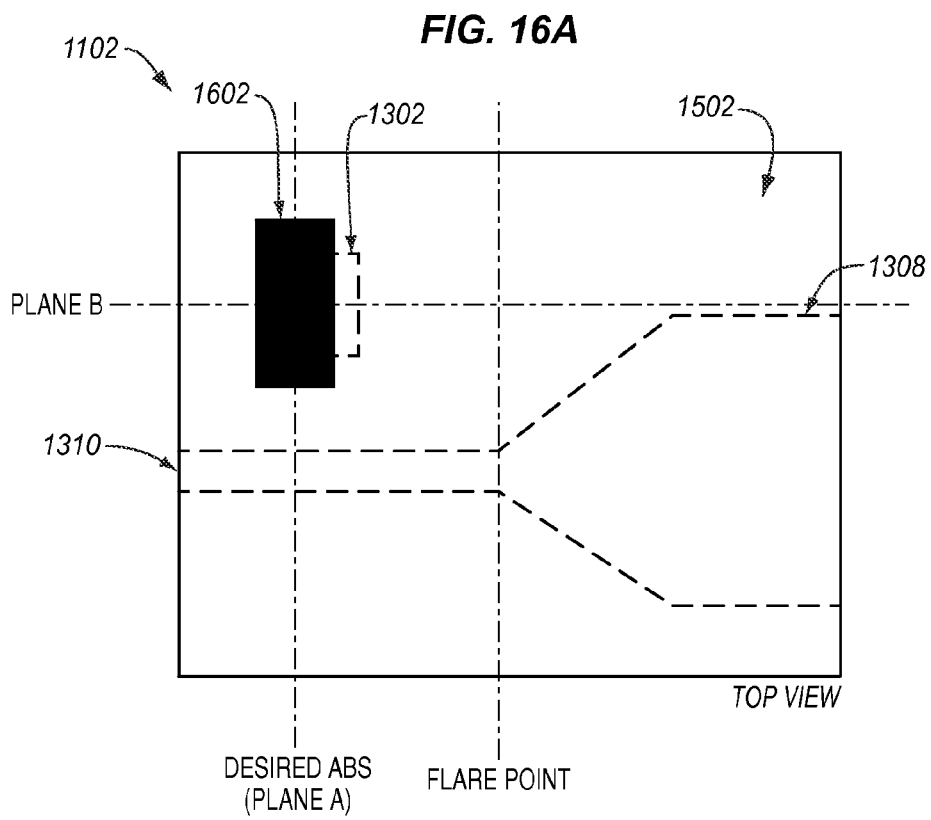
FIGS. 16A, 16B, and 16C are a top view, a cross-sectional view A, and a cross-sectional view B, respectively, illustrating the write head after depositing an electrically conductive material according to a step of the method of FIG. 10.
Figure 16B:
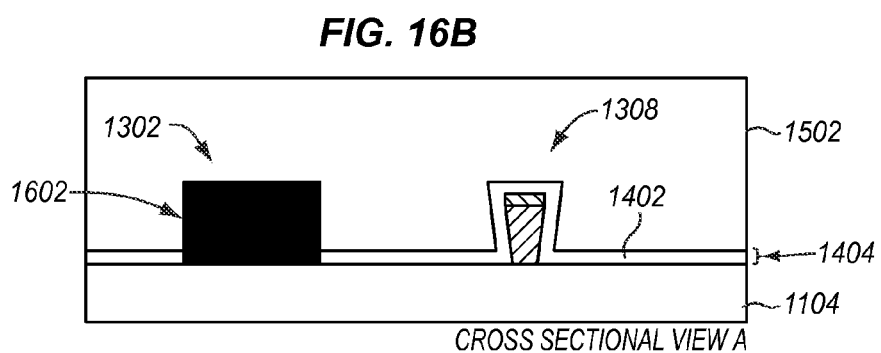
Figure 16C:
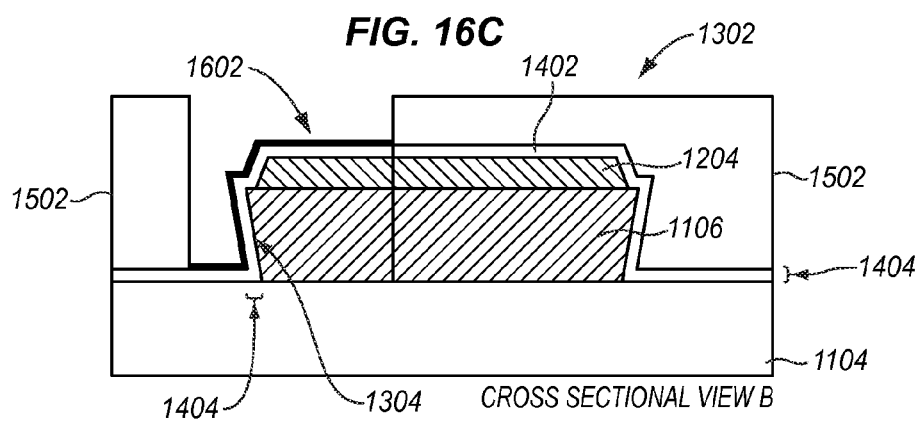

Step 1014 comprises depositing an electrically conductive material on first gap layer 1402 exposed by opening 1504 of second mask structure 1502. FIGS. 16A, 16B, and 16C are a top view, a cross-sectional view A, and a cross-sectional view B, respectively, illustrating write head 1102 after depositing an electrically conductive material 1602 according to step 1014. Electrically conductive material 1602 covers first gap layer 1402 disposed along front edge 1304 of ELG 1302 where it was exposed by opening 1504 (see FIG. 15A) of second mask structure 1402. Electrically conductive material 1602 may also cover second mask structure 1502 in this step, but this has been omitted to allow for the features under mask structure 1502 to be clearly identified. Note that in FIG. 16C, electrically conductive material 1602 is isolated from both front edge 1304 of ELG 1302 and the previously exposed portion 1304 of magnetic material 1106 (see FIG. 13A) by first gap layer 1402.

Figure 17A:
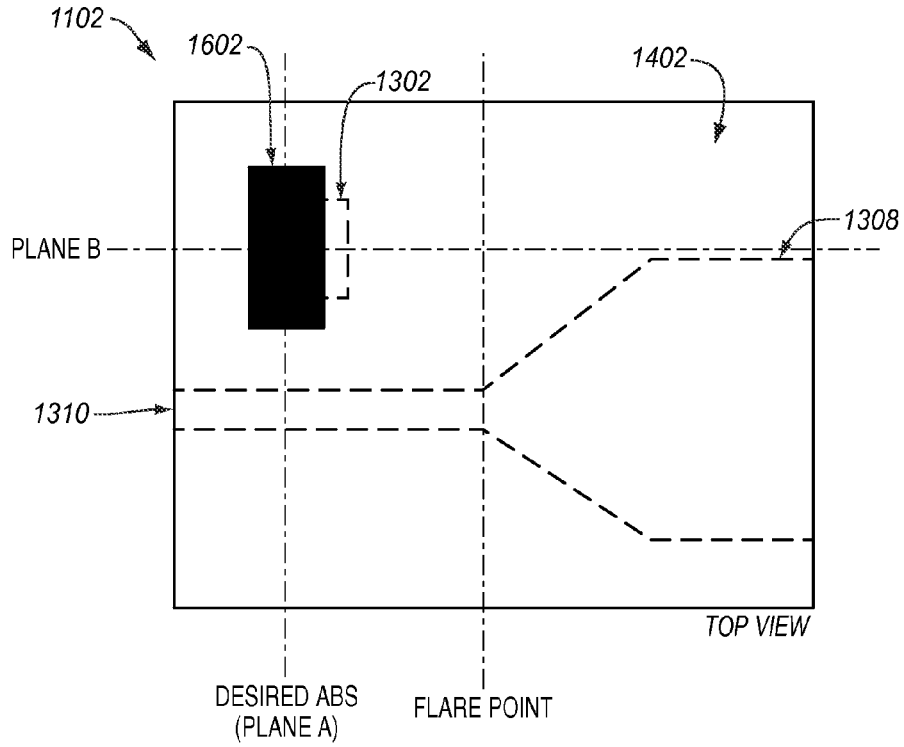
FIGS. 17A, 17B, and 17C are a top view, a cross-sectional view A, and a cross-sectional view B, respectively, illustrating the write head after removing a second mask structure according to a step of the method of FIG. 10.
Figure 17B:
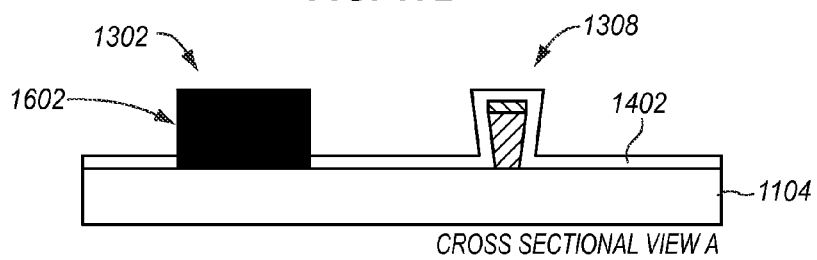
Figure 17C:
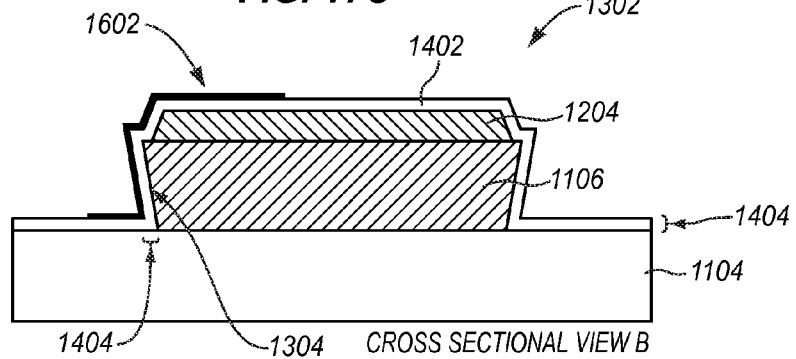

Step 1016 comprises removing second mask structure 1502. FIGS. 17A, 17B, and 17C are a top view, a cross-sectional view A, and a cross-sectional view B, respectively, illustrating write head 1102 after removing second mask structure 1502 according to step 1016. When second mask structure 1502 is removed, pole tip 1310 is protected from damage by first gap layer 1402. This can be seen in the cross sectional view A shown in FIG. 17B illustrating first gap layer 1402 surrounding main write pole 1308 and pole tip 1310. Because the fragile pole tip 1310 is protected by first gap layer 1402, the chances of breaking pole tip 1312 when removing second mask structure 1502 are greatly reduced.

Step 1018 comprises depositing a second non-magnetic gap layer. Step 1020 comprises fabricating a shield for main write pole 1308. FIGS. 18A, 18B, and 18C are a top view, a cross-sectional view A, and a cross-sectional view B, respectively, illustrating write head 1102 after depositing a second non-magnetic gap layer 1802 and fabricating a shield 1804 according to steps 1018 and 1020. Shield 1804 may be a wrap around shield or a trailing shield. Further, one skilled in the art will understand that forming shield 1804 may comprise a number of steps not shown, such as etching around main write pole 1308, planarizing main write pole 1308 to remove material above hard mask 1204, depositing seed layers, and electroplating shield material.

As discussed previously with respect to the prior art ELG 602 (see FIGS. 6A-6C), hard mask erosion may move the trigger point of ELG 602 such that the desired ABS point in the lapping process may not be determined accurately. How ELG 1302 (see FIGS. 18A-18C) overcomes hard mask erosion will be discussed in more detail below.

After a wafer of sliders is fabricated, the sliders are cut into rows of sliders or individual sliders for lapping. In the cross sectional view B shown in FIG. 18C, the arrow indicates the direction of the lapping process. As the lapping progresses, material is removed from the cut surface of the slider. During the lapping process, a resistance of ELG 1302 is monitored to determine the desired ABS. To monitor the resistance of ELG 1302, an electrical circuit is created that includes electrically conductive material 1602 as part of the circuit (for the purpose of this discussion, consider that material 1602 is gold). As gold 1602 is removed from ELG 1302, the resistance of the circuit would remain relatively the same because gold is a metal, and therefore is a good conductor of electricity. However, when gold 1602 is lapped away and detaches from the surface of first gap layer 1402, the resistance increases sharply because now the electrical path of the circuit includes gap layer 1402, which typically is an insulator such as alumina. FIG. 18C illustrates this trigger point in the lapping process. Note that the desired ABS point is slightly to the right of the trigger point and separated by the trigger point by thickness 1404 of first gap layer 1402. This indicates that the trigger point during the lapping process occurs before reaching the desired ABS. Typically, depositing first gap layer 1402 to a target thickness is well controlled. For example, first gap layer 1402 may be deposited via an ALD process, which allows a fabrication operator to control thickness 1404 of first gap layer 1402 with some precision. Therefore, an offset between the trigger point and the desired ABS as shown in FIG. 18C may be readily calculated. For example, if thickness 1404 is about 50 nanometers of alumina, then the fabrication operator may continue lapping after reaching the trigger point by a pre-determined amount to reach the desired ABS. This allows the fabrication operator to accurately locate the desired ABS position relative to the flare point of write pole 1308.

Although specific embodiments were described herein, the scope of the invention is not limited to those specific embodiments. The scope of the invention is defined by the following claims and any equivalents thereof.

We claim:

1. A method of fabricating a magnetic write head, the method comprising:
   depositing magnetic material;
   forming a first mask structure on the magnetic material that defines a shape for a main write pole and a corresponding electrical lapping guide (ELG) having a front edge;
   performing a removal process which removes the magnetic material exposed by the first mask structure to define the main write pole and the ELG having the front edge;
   removing the first mask structure;
   depositing a first non-magnetic gap layer;
   forming a second mask structure on the first gap layer that has an opening exposing at least a portion of the first gap layer disposed along the front edge of the ELG;

depositing an electrically conductive material on the first gap layer exposed by the opening of the second mask structure;

removing the second mask structure;

depositing a second non-magnetic gap layer; and fabricating a shield for the main write pole.

2. The method of claim 1 wherein fabricating the shield further comprises:

fabricating a wrap around shield for the main write pole, wherein the first gap layer and the second gap layer define a side gap for the wrap around shield.

3. The method of claim 1 wherein fabricating the shield further comprises:

fabricating a trailing shield for the main write pole.

4. The method of claim 1 wherein the first gap layer is deposited by an atomic layer deposition process.

5. The method of claim 1 wherein the front edge of the ELG is located relative to a flare point of the main write pole.

6. The method of claim 5 wherein the electrically conductive material locates the flare point of the main write pole based on a location of the front edge of the ELG and a thickness of the first gap layer.

7. The method of claim 1 wherein a thickness of the first gap layer disposed along the front edge of the ELG is about 50 nanometers.

8. The method of claim 1 wherein the electrically conductive material is gold.

9. The method of claim 1 wherein the electrically conductive material is electrically isolated from the magnetic material of the ELG by the first gap layer.

10. A method of fabricating a magnetic write head, the method comprising:

fabricating a main write pole for the write head and a corresponding electrical lapping guide (ELG), wherein the ELG comprises:

a magnetic material having a front edge;

a first non-magnetic gap layer disposed along the front edge;

an electrically conductive material on at least a portion of the first gap layer disposed along the front edge; and a second non-magnetic gap layer on the electrically conductive material; and fabricating a shield for the main write pole.

11. The method of claim 10 wherein a thickness of the first gap layer disposed along the front edge of the ELG is about 50 nanometers.

12. The method of claim 10 wherein fabricating the shield further comprises:

fabricating a wrap around shield for the main write pole, wherein the first gap layer and the second gap layer define a side gap for the wrap around shield.

13. The method of claim 10 wherein the first gap layer is deposited by an atomic layer deposition process.

14. The method of claim 10 wherein the electrically conductive material is gold.

15. The method of claim 10 wherein the electrically conductive material is electrically isolated from the magnetic material of the ELG by the first gap layer.

16. The method of claim 10 wherein fabricating the shield further comprises:

fabricating a trailing shield for the main write pole.

17. The method of claim 10 wherein the front edge of the ELG is located relative to a flare point of the write pole.

18. The method of claim 17 further comprising:

performing a lapping process on the main write pole substantially parallel to the front edge of the ELG; and monitoring a lapping depth of the lapping process based on an abrupt change in a resistance of the ELG.

19. The method of claim 18 further comprising:

identifying the abrupt change in the resistance of the ELG to determine a distance to a flare point of the main write pole.

20. The method of claim 19 wherein the distance to the flare point is determined based on a thickness of the first gap layer and the front edge of the ELG.

* * * * *